US010794487B2

(12) United States Patent
Janakiraman et al.

(10) Patent No.: US 10,794,487 B2
(45) Date of Patent: Oct. 6, 2020

(54) ACTUATOR ASSEMBLY HAVING SELF-LUBRICATING COMPONENTS

(71) Applicant: GOODRICH AEROSPACE SERVICES PRIVATE LIMITED, Bangalore (IN)

(72) Inventors: Rajasekaran Janakiraman, Doddanekundi (IN); Hari Charan R B N Rayadurgam, Bengaluru (IN)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/165,462

(22) Filed: Oct. 19, 2018

(65) Prior Publication Data

US 2019/0154150 A1 May 23, 2019

(30) Foreign Application Priority Data

Nov. 17, 2017 (IN) ............................. 201711041189

(51) Int. Cl.
*F15B 15/14* (2006.01)
*F16J 1/08* (2006.01)
(Continued)

(52) U.S. Cl.
CPC ................ *F16J 1/08* (2013.01); *B64D 29/00* (2013.01); *F02C 7/00* (2013.01); *F15B 15/148* (2013.01); *F15B 15/1433* (2013.01); *F15B 15/1438* (2013.01); *F15B 15/1447* (2013.01); *F15B 15/1461* (2013.01); *F05D 2230/72* (2013.01)

(58) Field of Classification Search
CPC .......................... F15B 15/1433; F15B 15/148
See application file for complete search history.

(56) References Cited

U.S. PATENT DOCUMENTS

| 334,037 A * | 1/1886 | Nash ................................ 92/155 |
| 1,964,671 A * | 6/1934 | Nesbitt ................... F16C 33/10 |
| | | 427/445 |

(Continued)

FOREIGN PATENT DOCUMENTS

| CN | 202768527 U | 3/2013 |
| CN | 105697444 A | 6/2016 |

(Continued)

OTHER PUBLICATIONS

EP Search Report; EP 18206766; dated Mar. 25, 2019; 8 pages.

*Primary Examiner* — Frank Daniel Lopez
(74) *Attorney, Agent, or Firm* — Cantor Colburn LLP

(57) ABSTRACT

An actuator assembly includes a housing, a piston rod, and an end gland. The housing defines a housing bore that extends along a first axis between a first housing end and a second housing end. The piston rod is at least partially disposed within the housing bore. The piston rod defines a piston bore that extends from a first piston end towards a second piston end along the first axis. The end gland has a first end gland surface that engages the piston rod and a second end gland surface that engages the housing bore. The end gland defines a first gland groove that extends from the first end gland surface towards the second end gland surface. The first gland groove is arranged to receive a self-lubricating filler that engages the piston rod. A self-lubricating bushing may also be provided to deposit a lubricant into the piston bore.

3 Claims, 2 Drawing Sheets

(51) Int. Cl.
*F02C 7/00* (2006.01)
*B64D 29/00* (2006.01)

(56) References Cited

U.S. PATENT DOCUMENTS

| | | | |
|---|---|---|---|
| 3,518,920 A | | 7/1970 | Bimba |
| 3,559,540 A | * | 2/1971 | Sheldon .............. F15B 15/1433 |
| | | | 92/163 |
| 3,831,999 A | * | 8/1974 | Sonneborn ............. B62D 33/07 |
| | | | 180/89.14 |
| 4,323,003 A | * | 4/1982 | Clippard, III ........ F16J 15/3268 |
| | | | 277/346 |
| 4,527,806 A | | 7/1985 | Ungchusri et al. |
| 4,664,362 A | * | 5/1987 | Hennells ............... F16F 9/0218 |
| | | | 188/322.17 |
| 8,707,854 B2 | * | 4/2014 | Meguro ................. B63H 20/10 |
| | | | 92/167 |
| 2016/0348720 A1 | | 12/2016 | Drew et al. |

FOREIGN PATENT DOCUMENTS

| | | |
|---|---|---|
| DE | 8704642 U1 | 5/1987 |
| DE | 102015214895 A1 | 2/2017 |
| GB | 1178940 A | 1/1970 |

\* cited by examiner

ACTUATOR ASSEMBLY HAVING SELF-LUBRICATING COMPONENTS

CROSS-REFERENCES TO RELATED APPLICATIONS

This patent application claims priority to Indian Provisional Patent Application Serial No. 201711041189, filed Nov. 17, 2017 which is incorporated herein by reference in its entirety.

STATEMENT REGARDING FEDERALLY SPONSORED RESEARCH OR DEVELOPMENT

None.

BACKGROUND

Exemplary embodiments pertain to the art of actuators for opening a gas turbine engine nacelle.

A gas turbine engine may be provided with a cowl or door that is movable to allow access to perform maintenance tasks. A ground service technician may operate an actuator to move the cowl or door between an open position and a closed position. Relative motion between the nacelle and the actuator may impart a load to the actuator that may affect sealing performance of seals associated with the actuator.

BRIEF DESCRIPTION

Disclosed is an actuator assembly that includes a housing, a piston rod, and an end gland. The housing defines a housing bore that extends along a first axis between a first housing end and a second housing end. The piston rod is at least partially disposed within the housing bore. The piston rod defines a piston bore that extends from a first piston end towards a second piston end along the first axis. The end gland has a first end gland surface that engages the piston rod and a second end gland surface that engages the housing bore. The end gland defines a first gland groove that extends from the first end gland surface towards the second end gland surface. The first gland groove is arranged to receive a self-lubricating filler that engages the piston rod.

In addition to one or more of the features described herein, the first end gland surface and the second end gland surface each extend between a first end gland end and a second end gland end along the first axis.

In addition to one or more of the features described herein, the end gland includes a flange that radially extends from the first end gland end and is disposed adjacent to an end surface of the housing.

In addition to one or more of the features described herein, a cup washer that is disposed between and engages the end surface of the housing and the flange.

In addition to one or more of the features described herein, the first gland groove is provided as part of a first helical groove that axially extends from the second end gland end towards the first end gland end and radially extends from the first end gland surface towards the second end gland surface.

In addition to one or more of the features described herein, the self-lubricating filler is disposed within the first helical groove.

In addition to one or more of the features described herein, the end gland defines a recess that is disposed proximate the first end gland end and extends from the first end gland surface towards the second end gland surface.

In addition to one or more of the features described herein, a resiliently mounted scraper is disposed within the recess.

Also disclosed is an actuator assembly that includes a housing, a piston rod, a lost motion device, and a bushing. The housing extends along a first axis between a first housing end and a second housing end. The piston rod is at least partially disposed within the housing. The piston rod defines a piston bore that extends from a first piston end towards a second piston end along the first axis. The lost motion device has a rod end that is disposed within the piston bore. The bushing has a first bushing surface that engages the rod end and a second bushing surface that engages the piston bore. The bushing defines a plurality of pockets that extend from the first bushing surface to the second bushing surface. Each pocket of the plurality of pockets is arranged to receive a self-lubricating plug that engages the piston rod and the rod end.

In addition to one or more of the features described herein, the first bushing surface and the second bushing surface each extend between a first bushing end and a second bushing end along the first axis.

In addition to one or more of the features described herein, the first piston end extends beyond the first housing end in a direction that extends from the second housing end towards the first housing end.

In addition to one or more of the features described herein, a retainer that is at least partially disposed about the first piston end and the first bushing end.

In addition to one or more of the features described herein, the first bushing end engages a stop surface defined by the retainer.

Further disclosed is a sealing and lubricating assembly for an actuator assembly that includes an end gland. The end gland has a first end gland surface and a second end gland surface. The first and second end gland surfaces extend between a first end gland end and a second end gland end along a first axis. The end gland is arranged to receive a self-lubricating filler.

In addition to one or more of the features described herein, a bushing has a first bushing surface and a second bushing surface. The first and second bushing surfaces extend between a first bushing end and a second bushing end along a first axis. The bushing is arranged to receive a self-lubricating plug.

In addition to one or more of the features described herein, the self-lubricating filler is disposed within a first helical groove that radially extends from the first end gland surface towards the second end gland surface.

In addition to one or more of the features described herein, the self-lubricating plug is disposed within a second helical groove that radially extends from the first bushing surface towards the second bushing surface and axially extends between the first bushing end and the second bushing end.

In addition to one or more of the features described herein, the self-lubricating plug is disposed within a pocket that radially extends from the first bushing surface to the second bushing surface.

In addition to one or more of the features described herein, the end gland is disposed about a piston rod and is disposed within a housing.

In addition to one or more of the features described herein, the bushing is disposed about a rod end of a lost motion device and is disposed within the piston rod.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1A:
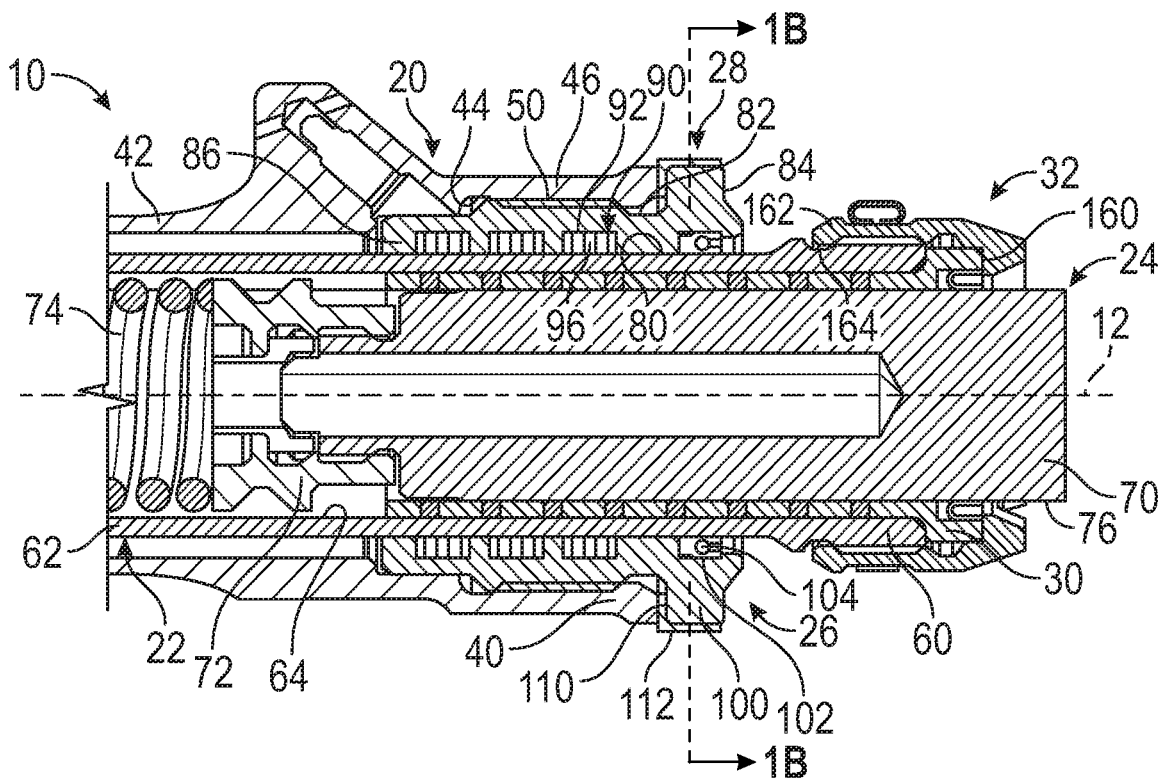
FIG. 1A is a partial cross-sectional view of an actuator assembly.

Referring to FIG. 1A, an actuator assembly 10 for a door opening system is shown. The door opening system is a stand-alone system that is arranged to open and close a door, cowl, or other type of panel of a nacelle of a gas turbine engine to facilitate ground maintenance. The actuator assembly 10 may be a hydraulic actuator that extends along or about a first axis 12. The actuator assembly 10 includes a housing 20, a piston rod 22, a lost motion device 24, an end gland 26, an L-shaped washer 28, a bushing 30, and a retainer 32.

The housing 20 has a first housing end 40 that is spaced apart from a second housing end 42 along the first axis 12. The housing 20 defines a housing bore 44 that extends along the first axis 12 from the first housing end 40 towards the second housing end 42.

A portion of the housing 20 proximate the first housing end 40 includes a threaded portion 46. The threaded portion 46 has a cross-sectional diameter or cross-sectional form that is greater than a cross-sectional diameter or cross-sectional form of the remainder of the housing 20. The threaded portion 46 includes a recessed region 50. The recessed region 50 radially extends, relative to the first axis 12, from the housing bore 44 towards an outer surface of the housing 20 and extends axially, relative to the first axis 12, between the first housing end 40 and the second housing end 42.

The piston rod 22 is at least partially disposed within the housing bore 44. The piston rod 22 is movable between an extended position and a retracted position along the first axis 12 relative to the housing 20 and is supported by a bearing member and the end gland 26.

The piston rod 22 extends along the first axis 12 between a first piston end 60 and a second piston end 62. The first piston end 60 extends beyond the first housing end 40 in a direction that extends from the second housing end 42 towards the first housing end 40. The piston rod 22 defines a piston bore 64 that extends from the first piston end 60 towards the second piston end 62.

The lost motion device 24 is at least partially disposed within the piston bore 64. The lost motion device 24 is arranged to allow differential motion between the piston rod 22 and the portion of the nacelle that the actuator assembly 10 is connected.

The lost motion device 24 includes a rod end 70, a connecting member 72, and a biasing member 74. The rod end 70 is disposed within the piston bore 64. The rod end 70 includes an outer rod surface 76 that faces towards the housing bore 44. The connecting member 72 is disposed between the rod end 70 and the biasing member 74. The biasing member 74 is arranged or positioned to compress or extend responsive to movement of the rod end 70 along the first axis 12 relative to the piston rod 22. The biasing member 74 of lost motion device 24 absorbs, damps, or dissipates vibrations or push and pull motion to protect the dynamic hydraulic sealing provided by the various sealing features of the actuator assembly 10 and to avoid overloading of the cowl door and associated structure.

Figure 1B:
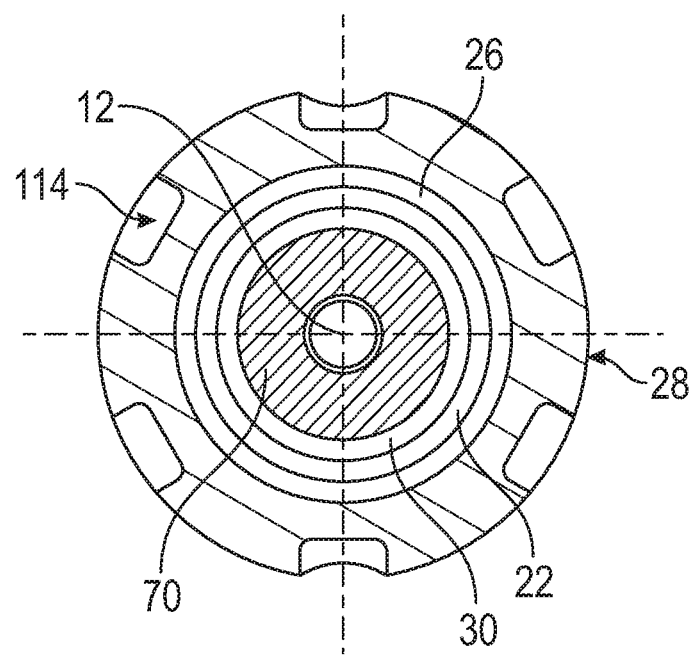
FIG. 1B is a section view taken along section line 1B.
Figure 2:
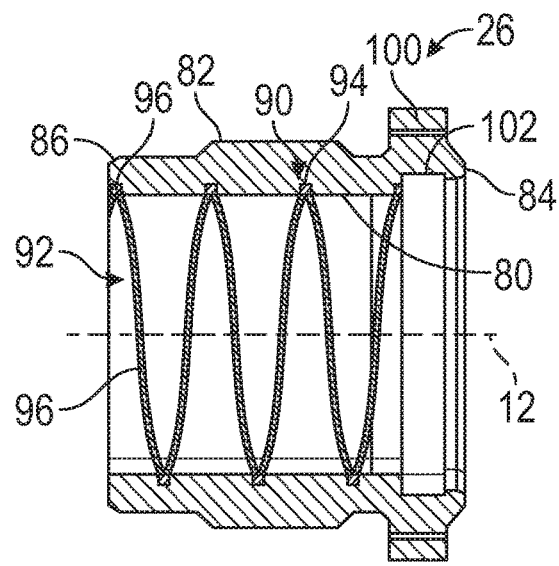
FIG. 2 is a cross-sectional view of a self-lubricating end gland.

Referring to FIGS. 1A, 1B, and 2, the end gland 26 is disposed about the piston rod 22 and is disposed within the housing bore 44 of the housing 20. At least a portion of the end gland 26 extends into the recessed region 50 and may inhibit axial movement of the end gland 26 relative to the first axis 12 towards the second housing end 42.

The end gland 26 includes a first end gland surface 80 and a second end gland surface 82 that each extend between a first end gland end 84 and a second end gland end 86 along the first axis 12. The first end gland surface 80 engages an exterior surface of the piston rod 22. The second end gland surface 82 engages the housing bore 44. At least a portion of the second end gland surface 82 extends into the recessed region 50.

The end gland 26 defines a plurality of gland grooves 90 that are provided as part of a first helical groove 92, as shown in FIGS. 1A and 2. The first helical groove 92 radially extends from the first end gland surface 80 towards the second end gland surface 82. The first helical groove 92 axially extends from the second end gland end 86 towards the first end gland end 84 but is spaced apart from the first end gland end 84. A first gland groove 94 of the plurality of gland grooves 90 radially extends from the first end gland surface 80 towards the second end gland surface 82. The first gland groove 94 of the plurality of gland grooves 90 is arranged to receive a self-lubricating filler 96, as shown in FIG. 1A. Furthermore, the self-lubricating filler 96 is disposed within the first helical groove 92.

The self-lubricating filler 96 may be a non-carbon based fill such as a PTFE/PTFE with molybdenum disulfide fill that may smear or deposit a dry film lubricant onto the exterior surface of the piston rod 22. The PTFE/PTFE with molybdenum disulfide fill may be provided with a bushing such as an aluminum bronze bushing that is received within the first gland groove 94 or in general between the end gland 26 and the piston rod 22. The self-lubricating filler 96 prevents material pick up onto the piston rod 22 from the end gland 26 due to contact stresses during vibration.

The end gland 26 further includes a flange 100 and a recess 102. The flange 100 is disposed proximate or at the first end gland end 84 and radially extends from the first end gland end 84. The flange 100 is disposed adjacent to an end surface of the first housing end 40 and acts as a stop feature to inhibit further movement of the end gland 26 towards the connecting member 72 or the biasing member 74 of the lost motion device 24 along the first axis 12. The recess 102 is disposed proximate the first end gland end 84. The recess 102 radially extends from the first end gland surface 80 towards the second end gland surface 82 and axially extends from the first end gland end 84 towards the second end gland end 86. A resiliently mounted scraper 104 is disposed within the recess 102.

Referring to FIGS. 1A and 1B, the cup washer 28 is disposed about a portion of the end gland 26 to prevent the end gland 26 from loosening during vibration. The cup washer 28 includes a first portion 110 and a second portion 112. The first portion 110 is disposed between and engages the end surface of the first housing end 40 of the housing 20 and the flange 100 of the end gland 26. The second portion 112 extends from the first portion 110 and is disposed about or wraps around a portion of the flange 100. The second portion 112 engages or extends into slots 114 that are defined by the flange 100 of the end gland 26. The second portion 112 of the cup washer 28 may be swaged into the slots 114 of the end gland 26.

Figure 3:
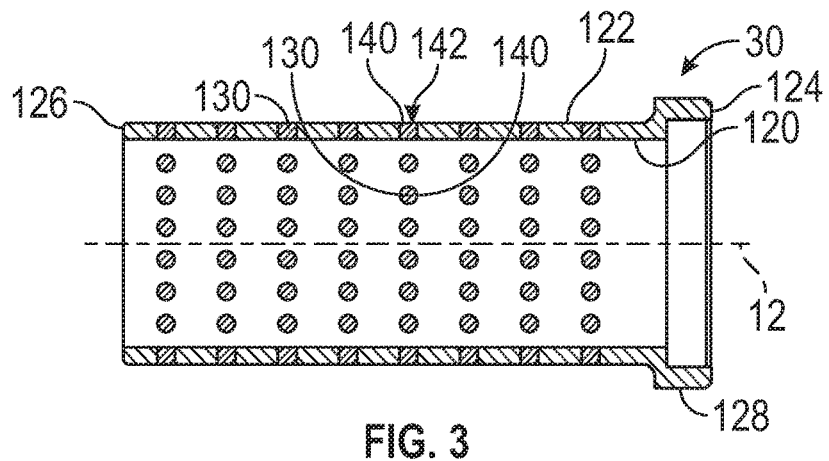
FIG. 3 is a cross-sectional view of a first embodiment of a self-lubricating bushing.
Figure 4:
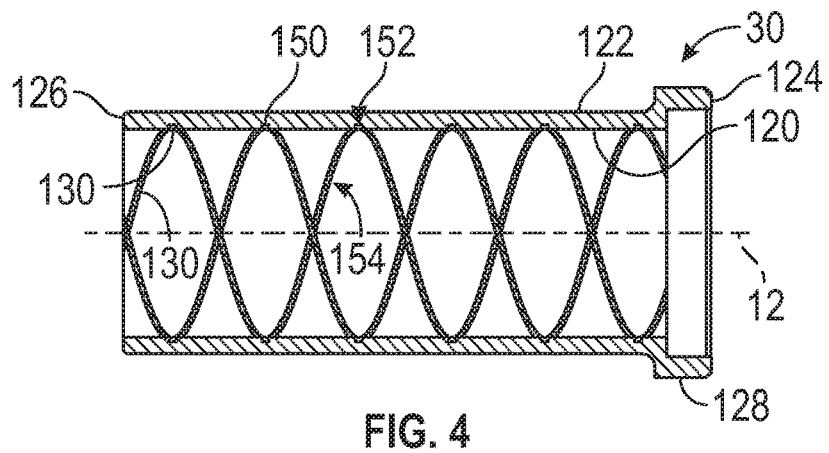
FIG. 4 is a cross-sectional view of a second embodiment of a self-lubricating bushing.

Referring to FIGS. 1A, 3, and 4, the bushing 30 is disposed about the rod end 70 and is disposed within the piston bore 64 of the piston rod 22. The bushing 30 includes a first bushing surface 120 and a second bushing surface 122 that each extend between a first bushing end 124 and a second bushing end 126 along the first axis 12. The first bushing surface 120 engages the outer rod surface 76 of the rod end 70. The second bushing surface 122 engages the piston bore 64 of the piston rod 22. A portion of the bushing 30 proximate the first bushing end 124 includes an enlarged portion 128. The enlarged portion 128 has a cross-sectional diameter or cross-sectional form that is greater than a cross-sectional diameter or cross-sectional form of the remainder of the bushing 30. An end surface of the enlarged portion 128 abuts or engages the first piston end 60.

The bushing 30 is arranged to receive at least one self-lubricating plug 130. The self-lubricating plug 130 may be received in each pocket 140 of a plurality of pockets 142, as shown in FIGS. 1A and 3. The plurality of pockets 142 may radially extend from the first bushing surface 120 towards the second bushing surface 122. The pockets 140 of the plurality of pockets 142 are axially spaced apart from each other.

The self-lubricating plug 130 may be received within a bushing groove 150 of a plurality of bushing grooves 152 that are defined by a second helical groove 154, as shown in FIG. 4. The second helical groove 154 radially extends from the first bushing surface 120 towards the second bushing surface 122 and axially extends between the first bushing end 124 and the second bushing end 126.

The rod end 70 of the lost motion device 24 moves relative to the bushing 30 such that sliding motion happens between the outer rod surface 76 and the first bushing surface 120. The self-lubricating plug 130 may be a non-carbon based fill such as a PTFE/PTFE-molybdenum disulfide fill. The PTFE/PTFE-molybdenum disulfide fill may be provided as part of a toughment/steel bushing that is received within one of the pocket 140 or bushing groove 150 or in general between the rod end 70 and the piston rod 22. Referring to FIG. 3, the self-lubricating plug 130 engages the piston bore 64 of the piston rod 22 and the outer rod surface 76 of the rod end 70 such that the self-lubricating plug 130 may smear or deposit a dry film lubricant into the piston bore 64 of the piston rod 22 and the outer rod surface 76 of the rod end 70. Referring to FIG. 4, the self-lubricating plug 130 may smear or deposit a dry film lubricant onto the outer rod surface 76 of the rod end 70.

The retainer 32 is spaced apart from the end gland 26 and is disposed about the first piston end 60, at least a portion of the rod end 70, and the first bushing end 124, as shown in FIG. 1A. The retainer 32 defines a stop surface 160 and a retaining feature 162. The stop surface 160 is disposed substantially perpendicular to the first axis 12 and engages the first bushing end 124. The retaining feature 162 is spaced apart from the stop surface 160 and extends into a notch or retaining groove 164 that is defined by the piston rod 22 that aids in retaining the retainer 32 on the piston rod 22.

The end gland 26 and the bushing 30 may be provided as part of a sealing and lubricating assembly for the actuator assembly 10. The incorporation of the self-lubricating filler 96 with the end gland 26 causes the end gland 26 to become a self-lubricating end gland and the incorporation of the self-lubricating plug 130 with the bushing 30 causes the bushing 30 to become a self-lubricating bushing. The use of the self-lubricating end gland inhibits material pick up onto the piston rod 22 from the end gland 26. The use of the self-lubricating bushing inhibits jamming of the rod end 70 of the lost motion device 24 and avoids direct contact of the rod end 70 with the bushing 30.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An actuator assembly, comprising:
    a housing that extends along a first axis between a first housing end and a second housing end;
    a piston rod at least partially disposed within the housing, the piston rod defining a piston bore that extends from a first piston end towards a second piston end along the first axis;
    a lost motion device having a rod end that is disposed within the piston bore;
    a bushing having a first bushing surface that engages the rod end and a second bushing surface that engages the piston bore, the bushing defining a plurality of pockets that extend from the first bushing surface to the second bushing surface, each pocket of the plurality of pockets being configured to receive a self-lubricating plug that engages the piston rod and the rod end; and
    a retainer that is at least partially disposed about the first piston end and the first bushing end, wherein the first bushing end engages a stop surface defined by the retainer.

2. The actuator assembly of claim 1, wherein the first bushing surface and the second bushing surface each extend between a first bushing end and a second bushing end along the first axis.

3. The actuator assembly of claim 2, wherein the first piston end extends beyond the first housing end in a direction that extends from the second housing end towards the first housing end.

* * * * *